(12) United States Patent
Lin

(10) Patent No.: US 8,922,734 B2
(45) Date of Patent: Dec. 30, 2014

(54) LENS AND LED UNIT USING THE LENS AND DISPLAY USING THE LED UNIT

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 39 days.

(21) Appl. No.: 13/709,075

(22) Filed: Dec. 10, 2012

(65) Prior Publication Data

US 2014/0092343 A1 Apr. 3, 2014

(51) Int. Cl.
*G02F 1/1335* (2006.01)
*F21V 5/04* (2006.01)

(52) U.S. Cl.
CPC .......... *G02F 1/133504* (2013.01); *F21V 5/04* (2013.01); *G02F 1/133606* (2013.01); *G02F 1/133603* (2013.01); *G02F 1/133611* (2013.01); *G02F 2001/133607* (2013.01)
USPC .......... 349/64; 362/246; 362/311.02; 362/326

(58) Field of Classification Search
None
See application file for complete search history.

(56) References Cited

U.S. PATENT DOCUMENTS

| 8,591,075 B2* | 11/2013 | Nakamura et al. ........ 362/311.09 |
| 2012/0105764 A1* | 5/2012 | Yokota ............................ 349/61 |
| 2012/0320309 A1* | 12/2012 | Hineno et al. .................. 349/64 |

* cited by examiner

*Primary Examiner* — Richard Kim
(74) *Attorney, Agent, or Firm* — Novak Druce Connolly Bove + Quigg LLP

(57) ABSTRACT

An exemplary lens for diffusing light from an LED to a diffusion plate of an LCD module, includes a light-refraction portion and a plurality of legs extending from the light-refraction portion. The light-refraction portion includes a light-incident face facing the LED and a light-emergent face opposite to the light-incident face and facing the diffusion plate. The light-incident face defines a plurality of dots therein. Each dot is a depression and has an inner face concaved from the light-incident face.

17 Claims, 3 Drawing Sheets

LENS AND LED UNIT USING THE LENS AND DISPLAY USING THE LED UNIT

BACKGROUND

1. Technical Field

The disclosure generally relates to a lens, and more particularly, to a lens used in an LED unit which is used in a display such as a liquid crystal display (LCD).

2. Description of Related Art

Nowadays LEDs (light emitting diodes) are applied widely in displays for illuminating the screens thereof. A type of display, generally called direct-backlight display, uses a plurality of LEDs which is located behind the screen thereof to directly illuminate the screen. In order to obtain a uniform illumination for the screen, a diffusion plate is often placed between the screen and the LEDs. However, the diffusion plate must be kept a sufficient distance from the LEDs, to thereby ensure that the light emitted from the LEDs can be evenly diffused by the diffusion plate before entering the screen. Thus, a thickness of the display cannot be thin enough. A way to resolve such problem is to provide a diffusion lens for each LED. Nevertheless, the diffusion capability of the lens is still insufficient such that some hot spots may be formed on the screen even after diffusion of the light by the diffusion lens.

What is needed, therefore, is a lens used in an LED unit of a direct-backlight display which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
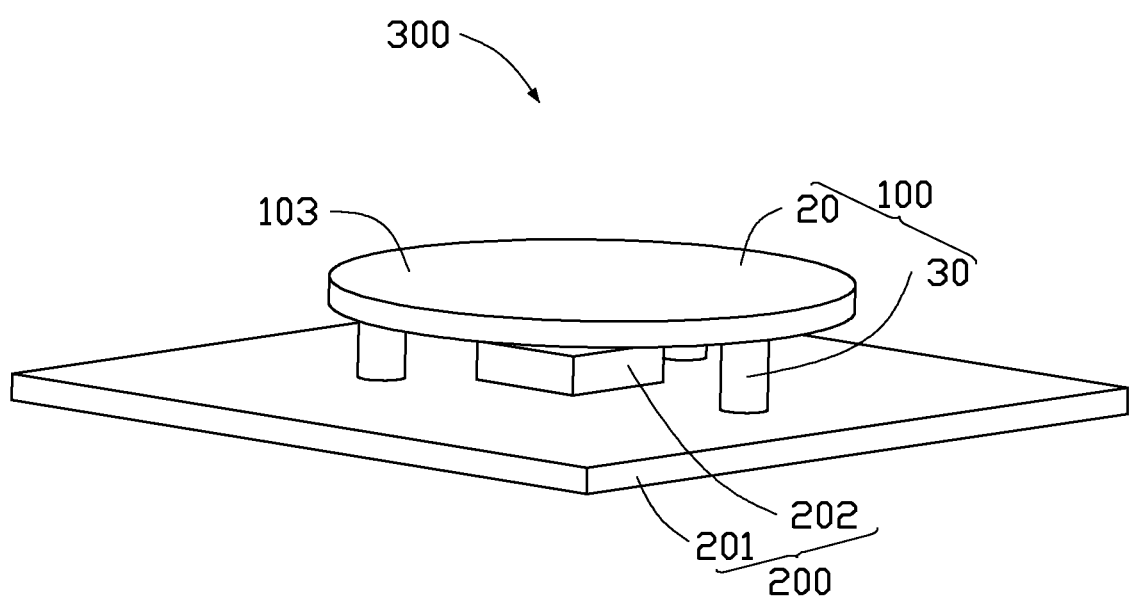
FIG. 1 is an isometric, assembled view of an LED unit in accordance with an embodiment of the present disclosure.

Referring to FIG. 1, an LED unit 300 in accordance with an embodiment of the present disclosure is shown. The LED unit 300 includes an LED module 200 and a lens 100 mounted on the LED module 200.

The LED module 200 includes a circuit board 201 and an LED 202 fixed on a top face of the circuit board 201.

Figure 2:
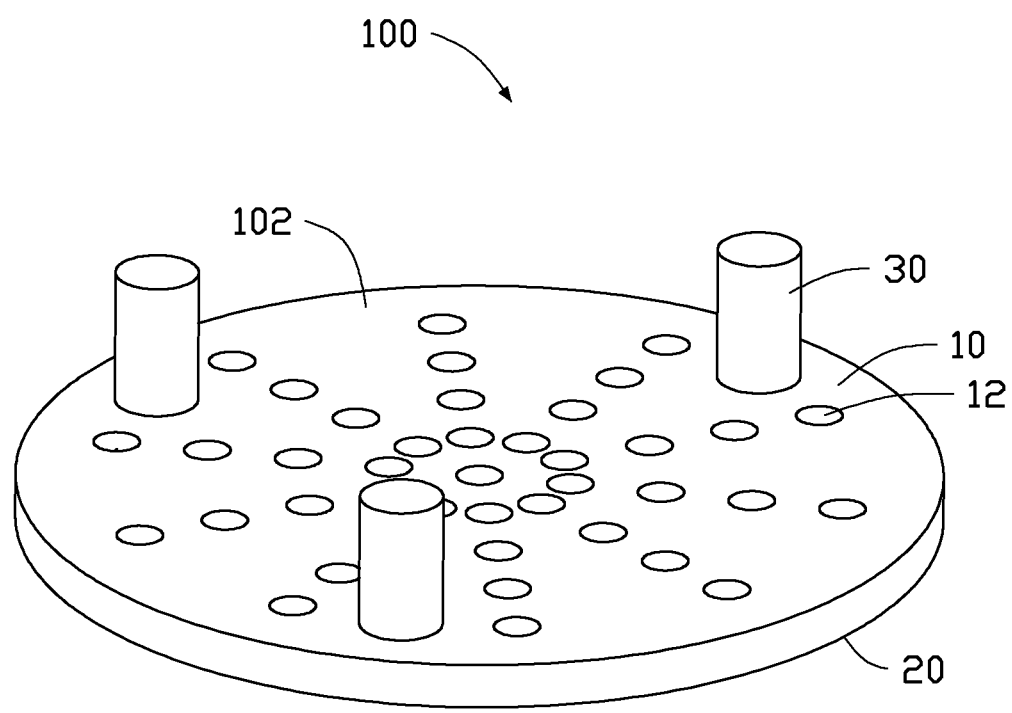
FIG. 2 is an inverted view of a lens of the LED unit of FIG. 1.

Also referring to FIG. 2, the lens 100 includes a light-refraction portion 10 and three supporting legs 30 extending downwardly from a bottom face of the light-refraction portion 10. The lens 100 is integrally made of a single monolithic piece of transparent materials such as PC (polycarbonate) or PMMA (polymethylmethacrylate). The light-refraction portion 10 has a circular shape. The light-refraction portion 10 includes a light-incident face 102 and a light-emergent face 103 opposite to the light-incident face 102. In this embodiment, both of the light-incident face 102 and the light-emergent face 103 are flat faces parallel to each other. Alternatively, one or both of the light-incident face 102 and the light-emergent face 103 may be a concave face or concave faces.

A plurality of dots 12 is defined in the light-incident face 102 of the lens 10. In this embodiment, each dot 12 is a small depression. Each dot 12 has an inner face 120 concaved upwardly towards the light-emergent face 103 (see FIG. 3). The dots 12 are arranged along a plurality of lines which intersect with each other at a center of the lens 100. On the other hand, the dots 12 can also be arranged on a plurality of circles concentric about the center of the lens 100. The dots 12 can distribute the light emitted from the LED 202 to a plurality of small and less intensive light spots, thereby increasing a uniformity of the light emergent from the lens 10. In an alternative embodiment, the dots 12 may be formed on the light-emergent face 103 of the lens 100, or both of the light-incident face 102 and the light-emergent face 103 of the lens 100.

The three legs 30 are formed on the light-incident face 102 of the lens 100, avoiding the dots 12. The three legs 30 are disposed on the top face of the circuit board 201 to support the light-refraction portion 10 over the LED 202. The three legs 30 may be fixed to the circuit board 201 by adhesive.

Figure 3:
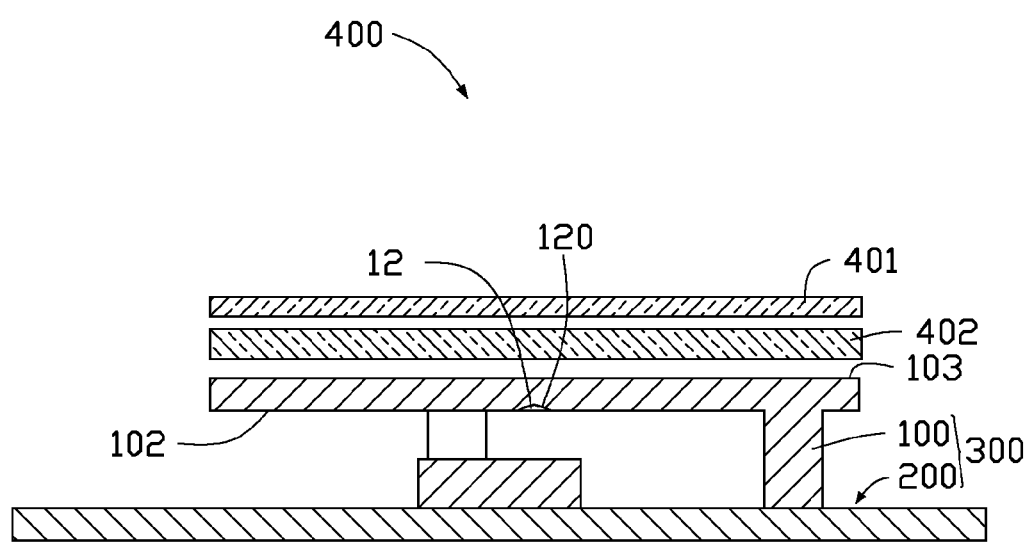
FIG. 3 is a cross section of a direct-backlight display using the LED unit of FIG. 1.

FIG. 3 shows a display 400 using the LED unit 300. The LED unit 300 is disposed behind a screen 401 of the display 400. The screen 401 is a screen for a liquid crystal display (LCD) module. In practice, there is a plurality of LED units 300 behind the screen 401, and the screen 401 has an area far larger than that of the LED unit 300. The light emitted from the LED 202 is diffused by the dots 12 of lens 100 into a plurality of spots on a diffusion plate 402 which further diffuses the light spots into a uniform light to uniformly illuminate the screen 401. Thus, the screen 401 can have a uniform illumination without significant hot spots appearing thereon. Since the lens 100 has a sufficient light-diffusion capability, the LED 202 is not required to be placed from the light-refraction portion 10 of the lens 100 with a large distance, whereby a thickness of the display 400 incorporating the LED unit 300 can be controlled thin enough. In addition, the required number of the LEDs of the display 400 can be lowered thereby to reduce the cost of the display 400.

It is noted that the display 400 of the present disclosure may be a direct-light display applied in computer, outside billboard or television.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens for diffusing light from an LED (light emitting diode) onto a diffusion plate of an LCD (light crystal display) module, comprising:

a light-refraction portion comprising a light-incident face and a light-emergent face opposite to the light-incident face, the light-emergent face being configured for facing the diffusion plate;

wherein one of the light-incident face and the light-emergent face defining a plurality of dots therein, each of the dots having an inner face concaved from the one of the light-incident face and the light-emergent face;

wherein the dots are arranged in a center of the light-refraction portion and a plurality of circles concentric about the center of the light-refraction portion, the number of the dots in each circle is equal to each other.

2. The lens of claim 1, wherein each of the dots is a depression defined in the one of the light-incident face and the light-emergent face.

3. The lens of claim 1, wherein the dots are arranged along a plurality of lines which intersect with each other at the center of the light-refraction portion.

4. The lens of claim 1, wherein the dots are defined in the light-incident face.

5. The lens of claim 1 further comprising a plurality of legs extending from the light-incident face in a direction away from the light-emergent face.

6. The lens of claim 5, wherein the legs of the lens are made of a single monolithic piece of a transparent material with the light refraction portion.

7. An LED (light emitting diode) unit for illuminating a screen of an LCD module via a diffusion plate, comprising:
   an LED; and
   a lens covering the LED, the lens comprising a light-refraction portion that comprises a light-incident face facing the LED and a light-emergent face opposite to the light-incident face and configured for facing the diffusion plate, one of the light-incident face and the light-emergent face defining a plurality of dots therein, each dot having an concaved face depressed from the one of the light-incident face and the light-emergent face to diffuse light emitted from the LED;
   wherein the dots are arranged in a center of the light-refraction portion and a plurality of circles concentric about the center of the light-refraction portion, the number of the dots in each circle is equal to each other.

8. The LED unit of claim 7, wherein the dots are arranged along a plurality of lines intersecting with each other at the center of the light-refraction portion.

9. The LED unit of claim 7, wherein the dots are defined in the light-incident face.

10. The LED unit of claim 7, wherein the lens further comprises a plurality of legs extending from the light-incident face towards the LED.

11. The LED unit of claim 10, wherein the LED is fixed on a circuit board, the legs being disposed on the circuit board to support the light-refraction portion over the LED.

12. An LCD module comprising:
    a screen;
    a diffusion plate located behind the screen;
    an LED (light emitting diode) module; and
    a lens placed between the LED module and the diffusion plate;
    wherein the lens comprises a light-incident face facing the LED module and a light-emergent face opposite to the light-incident face and facing the diffusion plate; and
    wherein a plurality of dots is defined in one of the light-incident face and the light-emergent face, each of the dots having a face concaved from the one of the light-incident face and the light-emergent face, light generated by the LED module and emitting to the lens being diffused by the dots into a plurality of less intensive light spots onto the diffusion plate;
    wherein the dots are arranged in a center of the light-refraction portion and a plurality of circles concentric about the center of the light-refraction portion, the number of the dots in each circle is equal to each other.

13. The LCD module of claim 12, wherein each of the dots is a depression defined in the one of the light-incident face and the light-emergent face.

14. The LCD module of claim 12, wherein the plurality of dots is also defined in another one of the light-incident face and the light-emergent face.

15. The LCD module of claim 12, wherein the dots are arranged in a plurality of lines intersecting at the center of the light-refraction portion.

16. The LCD module of claim 12, wherein the light-incident face is a concaved face.

17. The LCD module of claim 12, wherein the screen is used in a television.

* * * * *